United States Patent [19]

Kuriyama et al.

[11] Patent Number: 4,674,288
[45] Date of Patent: Jun. 23, 1987

[54] METHOD OF MAGNETIC REFRIGERATION AND A MAGNETIC REFRIGERATING APPARATUS

[75] Inventors: Toru Kuriyama; Hideki Nakagome, both of Yokohama, Japan

[73] Assignee: Kabushiki Kaisha Toshiba, Kawasaki, Japan

[21] Appl. No.: 897,286

[22] Filed: Aug. 18, 1986

[30] Foreign Application Priority Data

Aug. 30, 1985 [JP] Japan ................................ 60-189916

[51] Int. Cl.⁴ .......................................... F25B 21/02
[52] U.S. Cl. ...................................................... 62/3
[58] Field of Search ............................................ 62/3

[56] References Cited

U.S. PATENT DOCUMENTS

| | | | |
|---|---|---|---|
| 4,033,734 | 7/1977 | Stegert, Jr. et al. | 62/3 |
| 4,069,028 | 1/1978 | Brown | 62/3 |
| 4,459,811 | 7/1984 | Barclay et al. | 62/3 |
| 4,554,790 | 11/1985 | Nakagome et al. | 62/3 |
| 4,599,866 | 7/1986 | Nakagome et al. | 62/3 |

OTHER PUBLICATIONS

Cryogenics, Oct. 1981, "Double Acting Reciprocating Magnetic Refrigerator: First Experiments", A. A. Laraze et al.

*Primary Examiner*—Lloyd L. King
*Attorney, Agent, or Firm*—Oblon, Fisher, Spivak, McClelland & Maier

[57] ABSTRACT

A magnetic refrigerating apparatus comprises a working substance adapted to produce heat when magnetized, and cool down when demagnetized, a superconductive coil for applying a predetermined magnetic field to the working substance, a regenerating pipe having a high-temperature portion and a low-temperature portion and being movable between a first position, where the high-temperature portion is located far away from the coil, and the low-temperature portion is located close to the coil, and a second position where the high-temperature portion is located close to the coil, and the low-temperature portion is located inside a vessel. The working substance and the regenerating pipe are respectively, so moved that the regenerating pipe is in the second position when the working substance is in the magnetization position, and that the regenerating pipe is in the first position when the working substance is in the demagnetization position.

6 Claims, 13 Drawing Figures

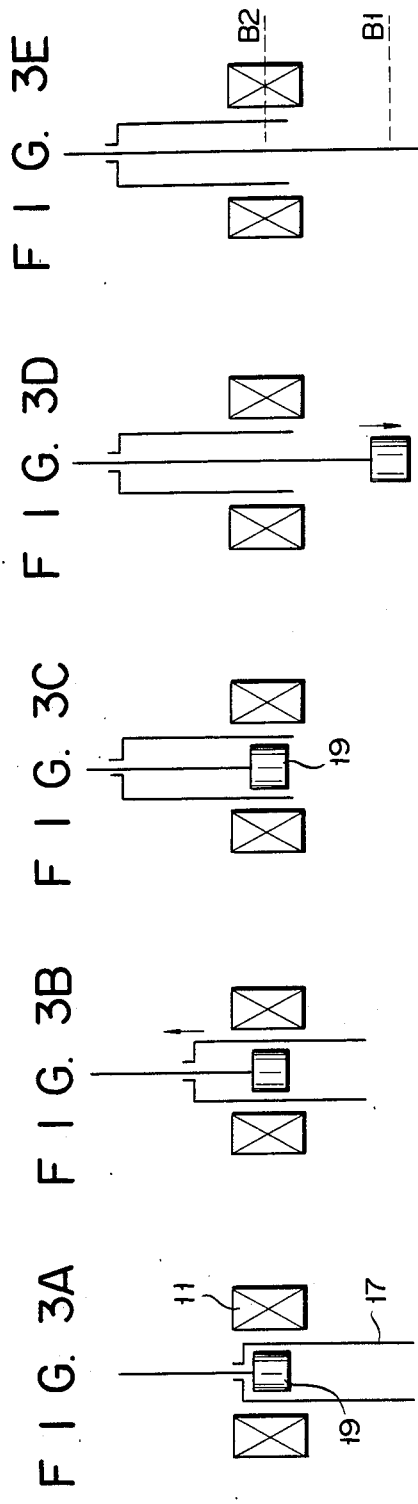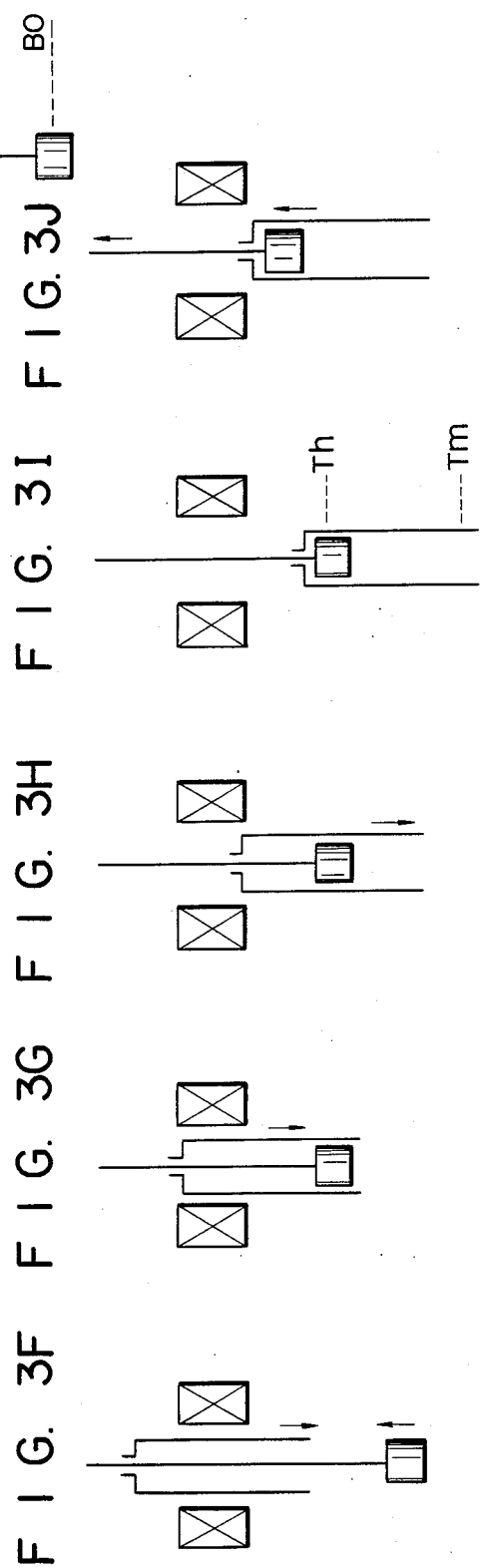

METHOD OF MAGNETIC REFRIGERATION AND A MAGNETIC REFRIGERATING APPARATUS

BACKGROUND OF THE INVENTION

The present invention relates to a method of magnetic refrigeration and a magnetic refrigerating apparatus utilizing the magnetocaloric effect.

Magnetic refrigerating apparatuses of this type are used to condense helium or other condensable gases, based on heat absorption by a magnetic substance, cooled by adiabatic demagnetization. These apparatuses have an advantage over conventional compression-type refrigerators in having a greater refrigerating capacity per unit volume.

Referring now to an entropy diagram of FIG. 1, the refrigeration cycle of one such prior art magnetic refrigerating apparatus will be described.

In FIG. 1, the axes of ordinate and abscissa represent entropy and absolute temperature, respectively. If a working substance or magnetic substance, such as gadolinium-gallium-garnet, is rapidly introduced into a magnetic field, its temperature rises from level Tc to Tm (from point C to D in the graph; adiabatic magnetization process). If heat, then produced in the working substance, is expelled to the outside, the entropy lowers (from point D to A; isothermal magnetization process). Then, if the working substance is quickly taken out of the magnetic field, its temperature drops from level Tm to Tc (from point A to B; adiabatic demagnetization process). If temperature Tc is equal to the condensation temperature of the condensable gas, the working substance condenses the gas by absorbing heat therefrom, so that the entropy increases from point B to C (isothermal demagnetization process).

In general, the refrigerating capability or capacity of refrigerators is determined by the difference between exo- and endothermic temperatures and the level of heat absorption. In the refrigeration cycle described above, however, if the temperature difference (Tm−Tc) between heat-discharge (high-temperature) side and heat-absorption (low-temperature) side becomes greater, the difference in entropy, i.e., the amount of absorbed heat, lowers from point AA, through BB and C, to DD of FIG. 1. Since this situation is attributable to the physical properties of the working substance, it has hitherto been considered difficult to fulfill these two conflicting requirements at the same time.

SUMMARY OF THE INVENTION

The object of the present invention is to provide a method of magnetic refrigeration and an apparatus therefor, capable of enlarging a difference in temperature between high- and low-temperature sides, without reducing the amount of absorbed heat.

According to the present invention, a method of magnetic refrigeration comprises processes of isomagnetic-field heat discharge and absorption, as well as steps of adiabatic magnetization and demagnetization. Therefore, the temperature difference between high-temperature side (Th) and low-temperature side (Tc) can be enlarged without reducing the amount of absorbed heat on the low-temperature side, thus improving the refrigerating capability substantially.

BRIEF DESCRIPTION OF THE DRAWINGS

FIGS. 3A to 3J are diagrams showing the relative positions of a regenerative cooling pipe and a working substance, for illustrating the operation of the apparatus of FIG. 2.

DETAILED DESCRIPTION OF THE PREFERRED EMBODIMENTS

An embodiment of the present invention will now be described in detail with reference to the accompanying drawings of FIGS. 2 to 4.

Figure 2:
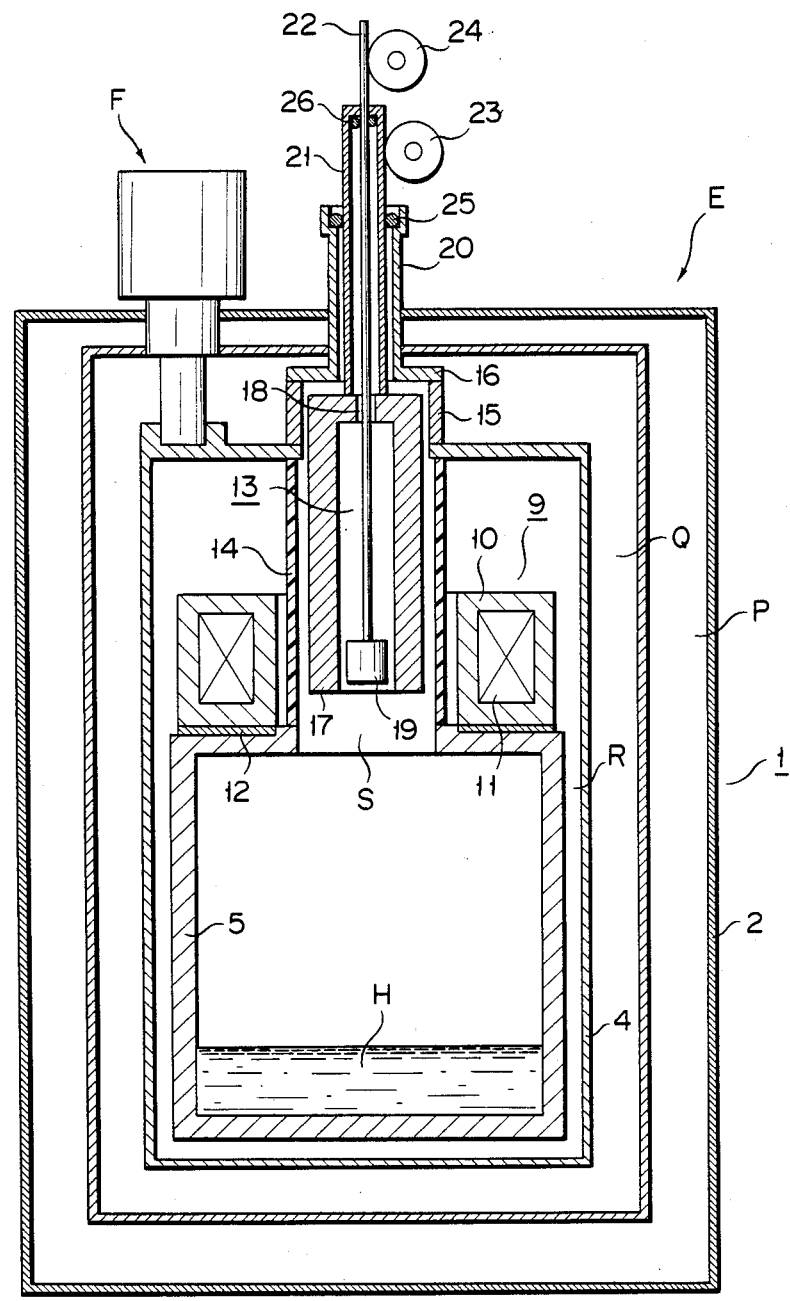
FIG. 2 is a vertical sectional view showing a construction of a helium liquefier according to an embodiment of the present invention.

FIG. 2 shows a specific arrangement in which a magnetic refrigerating apparatus, according to the embodiment of the invention, is incorporated in a helium liquefier. The apparatus generally comprises liquefier body E and precooler F.

Liquefier body E includes helium tank 1. Tank 1 is formed of a triple-cylinder structure, including cylindrical outer tank 2 and two cylindrical inner tanks 3 and 4, closed at both ends, and helium vessel 5 inside the structure. Space P between tanks 2 and 3, space Q between tanks 3 and 4, and space R between tank 4 and vessel 5 are evacuated in a conventional manner, by means of a vacuum pump (not shown), to form a vacuum adiabatic layer. For example, outer tank 2 is formed of a nonmagnetic material with low thermal conductivity, while inner tanks 3 and 4 and helium vessel 5 are made of a nonmagnetic material with high thermal conductivity.

Ring-shaped superconductive coil 9, as a magnetic field generator, is located coaxially in the upper portion of helium vessel 5, inside inner tank 4. Coil 9 includes ring-shaped casing 10, made of a nonmagnetic thermal conductor, and superconductive coil body 11 contained therein. The coil is mounted on vessel 5, with foil 12 of nonmagnetic thermal conductor between them. Thus, coil body 11 is thermally connected to liquid helium H at the bottom of vessel 5, successively through casing 10, foil 12, and vessel 5, to be cooled to a predetermined temperature.

Main section 13 of the magnetic refrigerating apparatus is located in a circular central space of superconductive coil 9, and above and/or below it. The main section is constructed as follows.

Concentric circular openings, with substantially equal diameters, are formed individually in the central portions of the respective top faces of helium vessel 5 and inner tank 4. Guide cylinder 14, having its inside diameter substantially equal the diameters of the circular openings, is connected airtightly, at both ends, between the peripheral edges of the openings. The lower portion of cylinder 14 is located in the circular space of superconductive coil 9. Radiation cylinder 15 is formed on the top face of inner tank 4, so as to be coaxial with cylinder 14. The lower end of cylinder 15 is airtightly connected to the top face of tank 4, thus sealing the opening therein. A top opening of cylinder 15 is closed by top cover plate 16. Cylinders 14 and 15 and plate 16 define columnar space S which extends through coil 9, thus connecting with the inside space of helium vessel 5. Guide cylinder 14 and cover plate 16 are formed of a nonmagnetic material, with low thermal conductivity, so that they can prevent penetration of external heat. Radiation cylinder 15, which is formed of a nonmagnetic thermal conductor, has an inside diameter a little greater (e.g., by approximately 100 μm) than the outside diameter of regenerative cooling pipe 17, which is disposed coaxially with guide cylinder 14, in space S. Pipe 17 is a cylindrical member, formed of a regenerative-cooling material such as lead, which has high specific heat per unit volume. The cooling pipe is open at its lower end, and is formed with small hole 18 in the center of its top end face. Working substance 19, e.g., gadolinium-gallium-garnet or other magnetic substance, is disposed coaxially in the inside space of pipe 17. The diameter of substance 19 is a little smaller (e.g., by approximately 100 μm) than the inside diameter of pipe 17. An opening is formed in the central portion of plate 16. Guide cylinder 20 is connected airtightly to plate 16, so as to seal the opening. It protrudes upward from the upper surface of plate 16, airtightly penetrating inner and outer tanks 3 and 2, and extending to the outside of the outer tank. Drive cylinder 21 is disposed coaxially in cylinder 20, and drive shaft 22 is located coaxially in cylinder 21. The lower end portion of cylinder 21 is connected to the upper end portion of cooling pipe 17. The upper end portion of cylinder 21 extends, through guide cylinder 20, to the outside of outer tank 2, projecting upward from the upper end of cylinder 20, and engaging drive unit 23. As drive cylinder 21 is moved up and down by the driving force of the unit 23, pipe 17 also moves up and down, within columnar space S. The lower end of shaft 22 is connected to the upper end of working substance 19. The upper end portion of shaft 22 engages drive unit 24, outside outer tank 2. The driving force of unit 24 serves to move shaft 22 and hence, substance 19, up and down. Drive units 23 and 24 are of a conventional configuration, each including a pinion, rotated by a motor (not shown), and a rack, formed on the upper portion of the side face of cylinder 21 or shaft 22, and engaging the pinion. Guide cylinder 20, drive cylinder 21, and drive shaft 22 are formed of a material with low thermal conductivity. Sealing rings 25 and 26 are used to seal the gaps between cylinders 20 and 21, and between cylinder 21 and shaft 22, respectively, thereby maintaining the airtightness of the tanks.

Precooler F, which is a conventional refrigerator, is thermally connected to outer and inner tanks 2, 3 and 4, and is used to precool the inner tanks.

The operation of the magnetic refrigerating apparatus, constructed in this manner, will now be described.

A predetermined amount of liquid helium H is stored in helium vessel 5. Coil body 11 is cooled to a very low temperature by helium H, whose temperature is transmitted through vessel 5, foil 12, and casing 10. When the coil body is energized, permanent current flows through it, thereby forming a magnetic field. The magnetic field is widest in the central portion of body 11, and narrows gradually toward the lower end.

Regenerative cooling pipe 17 and working substance 19 are reciprocated vertically, in the magnetic field produced by coil body 11, by drive units 23 and 24, respectively. Pipe 17 has a length such that its lower end is located on the center of coil body 11 when the pipe is at its upper action limit, or in the position shown in FIG. 2. The traveling stroke of pipe 17 is set so that the upper end of the pipe is located below the center plane of body 11 when the pipe is at its lower action limit. Substance 19 has its stroke between an upper action limit, on the center plane of body 11, and a lower action limit, which corresponds to a position where the intensity of the magnetic field, generated by the coil body, is extremely low. Pipe 17 and substance 19 move up and down, independently.

Figure 1:
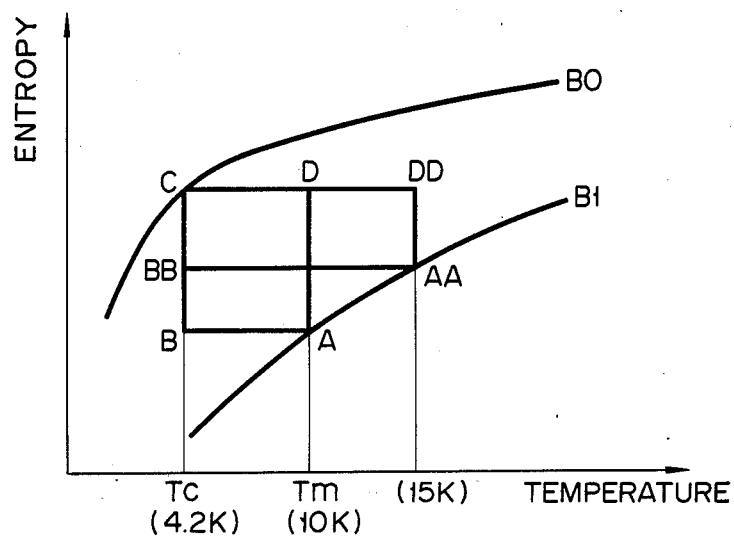
FIG. 1 is a refrigeration-cycle diagram of a prior art magnetic refrigerating apparatus.
Figure 4:
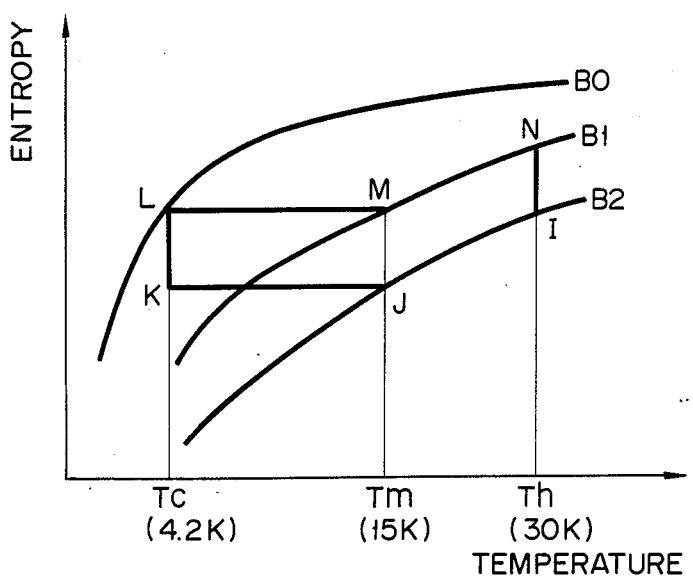
FIG. 4 is a refrigeration-cycle diagram of the apparatus of FIG. 2.

Referring now to FIGS. 3 and 4, the actions of regenerative cooling pipe 17 and working substance 19 will be described.

Cooling pipe 17 has a temperature gradient in its axial direction. In FIG. 4, symbols Th and Tm indicate temperatures at the upper and lower ends of pipe 17, respectively. This temperature gradient may be produced by working substance 19 when pipe 17 and substance 19 are moved several times, for preparatory arrangements. At the start, the upper end of pipe 17 is on the center plane of coil body 11, as shown in FIG. 3A. Also, substance 19 is located on the center plane of body 11, which corresponds to magnetic flux density B2, or the maximum magnetic field generated by body 11. The temperature of substance 19 is equal to temperature Th of the upper end of pipe 17 (point I in FIG. 4). Thereafter, only pipe 17 is moved up, as shown in FIG. 3B. At this time, working substance 19, in isomagnetic field B2 exchanges heat with cooling pipe 17 having the temperature gradient, through the medium of helium gas in a narrow gap between pipe 17 and substance 19 (from point I to J in FIG. 4). When pipe 17 reaches its upper action limit, as shown in FIG. 3C, substance 19 has temperature Tm in magnetic field B2, which is indicated by point J in FIG. 4. Subsequently, pipe 17, while standing still itself, causes substance 19 to move downward, as shown in FIG. 3D. As a result, substance 19 is adiabatically demagnetized, and cooled to a lower temperature (from point J to K in FIG. 4). If the temperature of substance 19 is lowered to Tc (usually, saturation temperature of liquid helium at 4.2 K) or less, the helium gas condenses at the surface of substance 19, and is demagnetized, while absorbing heat isothermally (from point K to L in FIG. 4). The liquid helium, resulting from the condensation of the helium gas at the surface of substance 19, falls in drops, thus collecting at the bottom of helium vessel 5. In this manner, the helium gas, evaporated by external heat transmitted to vessel 5, is liquefied. At its lower action limit (FIG. 3E; point L in FIG. 4), working substance 19 moves up again to be magnetized adiabatically, and to produce heat (from point L to M in FIG. 4). At the same time, cooling pipe 17 moves downward, as shown in FIG. 3F. When substance 19 reaches temperature Tm, in magnetic field B1, as indicated by point M in FIG. 4, it is located in the lower portion of pipe 17, as shown in FIG. 3G. Then, only pipe 17 further moves downward, with substance 19 kept at a standstill, as shown in FIG. 3H. At this time, substance 19, in isomagnetic field B1, exchanges heat with pipe 17, through the medium of the helium gas in the narrow gap between pipe 17 and substance 19 (from point M to N in FIG. 4), in the same manner as aforesaid. When pipe 17 reaches its lower action limit, substance 19 is located in the upper portion of pipe 17, as shown in FIG. 3I, and assumes temperature Th, corresponding to point N of FIG. 4. Subsequently, pipe 17 and substance 19 move upward at the same speed, as shown in FIG. 3J. Thereupon, working substance 19 is magnetized, thus producing heat. Due to the heat exchange with regenerative cooling pipe 17, however, substance 19 is magnetized isothermally (at Th), thus changing its magnetic flux density from B1 to B2. This corresponds to the process from point N to I of FIG. 4.

Thus, an entire cycle is completed. Extra heat transmitted from working substance 19 to cooling pipe 17 is discharged in the following manner, through radiation cylinder 15 attached to inner tank 4, when pipe 17 is at its upper action limit, as shown FIGS. 3C, 3D and 3E.

As mentioned before, radiation cylinder 15 is formed of a nonmagnetic thermal conductor, and has an inside diameter a little greater than the outside diameter of regenerative cooling pipe 17. When pipe 17 is located at its upper action limit such that its upper portion is in radiation cylinder 15, heat inside pipe 17 is transmitted to cylinder 15 through the helium gas in the narrow gap. The heat received by cylinder 15 is extracted to the outside, via inner tank 4 and precooler F.

In this manner, the helium gas, evaporated by external heat introduced into vessel 5, is liquefied. Thereupon, coil body 11 can be cooled satisfactorily by keeping the level of liquid helium H, in vessel 5, fixed. Thus, the function of the coil body, as a superconductive coil unit, can be maintained for a long time.

It is to be understood that the present invention is not limited to the embodiment described above.

In the above embodiment, for example, regenerative cooling pipe 17 and working substance 19 are moved relatively to superconductive coil 9, as a magnetic field generator. Alternatively, however, coil 9 and substance 19 may be moved relatively to pipe 17, or coil 9 and pipe 17 may be moved relatively to substance 19. In connection with the foregoing embodiment, moreover, the field generator has been described as being moved relative to the working substance and cooling pipe, to change the magnetic field generated thereby. Alternatively, the field may be changed by controlling the field generator electrically. The movement of the working substance and/or cooling pipe is not limited to an axial one, and may alternatively be a rotation. In the above embodiment, furthermore, the regenerator means is formed of the regenerative cooling pipe, in which the working substance can be inserted. However, it need not always be a tubular structure, and may, for example, be in the form of a plate which cannot receive the working substance therein. In any case, the regenerator means should preferably be located close to, and for the sake of thermal efficiency, in contact with the working substance.

The working substance is not limited to gadolinium-gallium-garnet, and may be dysprosium-aluminum-garnet or any other suitable magnetic substances, alternatively.

What is claimed is:

1. A magnetic refrigerating apparatus comprising:
    a working substance adapted to produce heat when magnetized, and cool down when demagnetized;
    magnetic field generator means for applying a predetermined magnetic field to the working substance;
    first drive means for changing the relative positions of the magnetic field generator means and the working substance, thereby changing the magnetic field applied to the working substance;
    regenerator means having a temperature gradient in its moving direction, and adapted to be moved relative to the working substance, so that heat is exchanged between the regenerator means and the working substance;
    second drive means for changing the position of the regenerator means, for the heat exchange with the working substance;
    holding means for holding a member to be cooled by the working substance when the working substance is demagnetized; and
    a heat-discharge system for discharging heat from the regenerator means to the outside of a space in which the working substance is located.

2. The magnetic refrigerating apparatus according to claim 1, wherein said magnetic field generator means is fixed to the holding means, and said first and second drive means move the working substance and the regenerator means, respectively.

3. The magnetic refrigerating apparatus according to claim 2, wherein said holding means has an opening, at one end thereof, and includes a vessel containing therein the member to be cooled, said magnetic field generator means includes a superconductive coil disposed outside the vessel, and said working substance is movable between a magnetization position, inside the coil, and a demagnetization position, inside the vessel.

4. The magnetic refrigerating apparatus according to claim 3, wherein said regenerator means includes a regenerating member having a high-temperature portion and a low-temperature portion, said regenerating member being movable between a first position, where the high-temperature portion is located far away from the coil, and the low-temperature portion is located close to the coil, and a second position, where the high-temperature portion is located close to the coil, and the low-temperature portion is located inside the vessel.

5. The magnetic refrigerating apparatus according to claim 4, wherein said regenerating member includes a regenerating pipe, permitting insertion of the working substance therein, for axial movement, and having a slot, opening toward the member to be cooled, in the vessel.

6. A method of refrigeration, comprising:
    an isomagnetic-field heat-discharging process for locating a working substance in a fixed magnetic field, and extracting heat from the working substance, said working substance being adapted to produce heat when magnetized, and cool down when demagnetized;
    a process for adiabatically demagnetizing the working substance;
    a process for isothermally demagnetizing the working substance;
    a process for adiabatically magnetizing the working substance;
    an isomagnetic-field heat-absorbing process for locating the working substance in the fixed magnetic field, and returning heat to the working substance; and
    a process for isothermally magnetizing the working substance again,
    said processes being repeated in the order named.

* * * * *